Dec. 17, 1940. M. K. PARKHURST 2,224,983
TEMPERATURE CONTROL FOR ELECTRICAL APPLIANCES
Filed Feb. 28, 1940 3 Sheets-Sheet 2
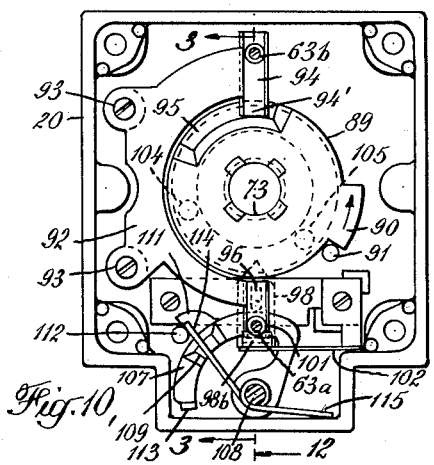
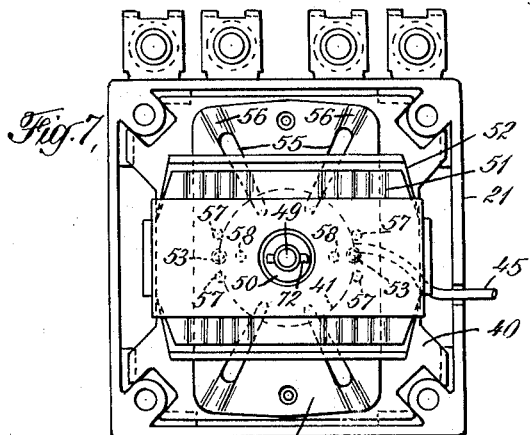
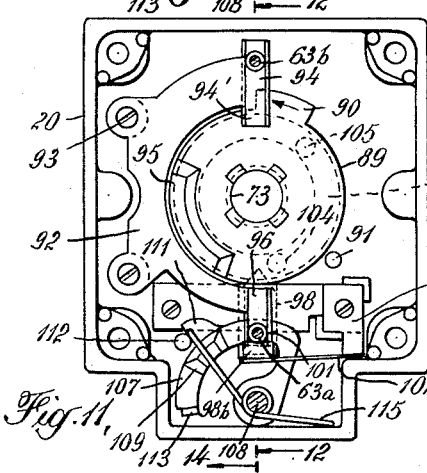
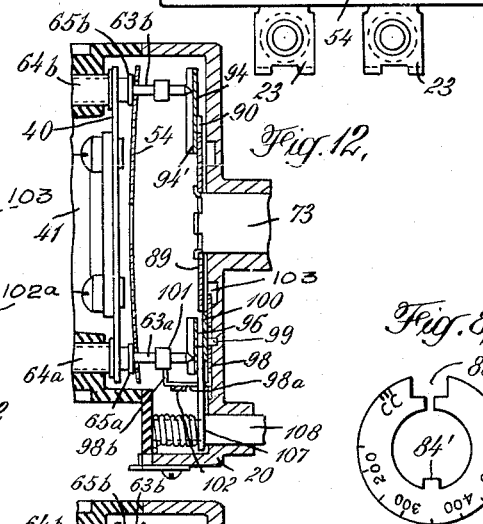
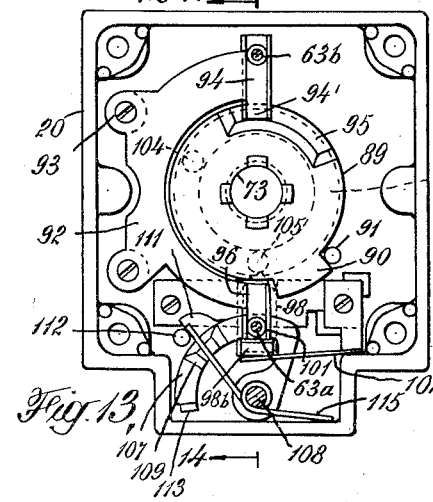
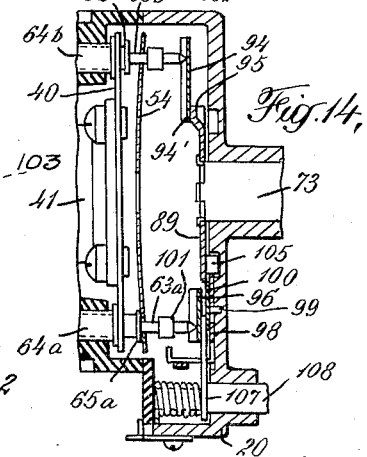
INVENTOR
Malcolm K. Parkhurst
BY
Pennie Davis Marvin & Edmonds
ATTORNEYS Dec. 17, 1940. M. K. PARKHURST 2,224,983
TEMPERATURE CONTROL FOR ELECTRICAL APPLIANCES
Filed Feb. 28, 1940 3 Sheets-Sheet 3
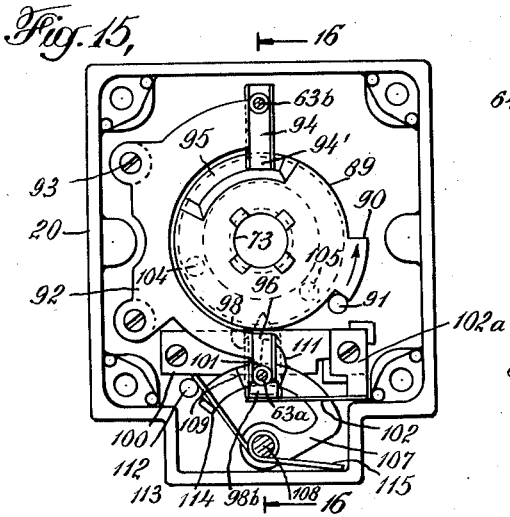
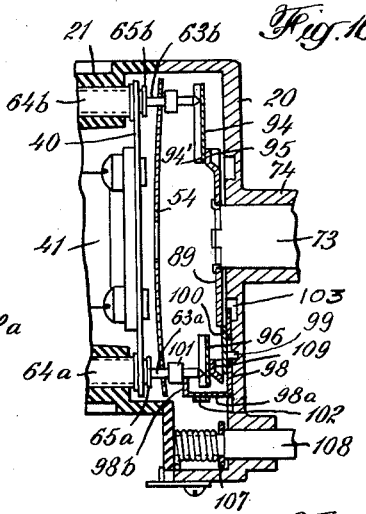
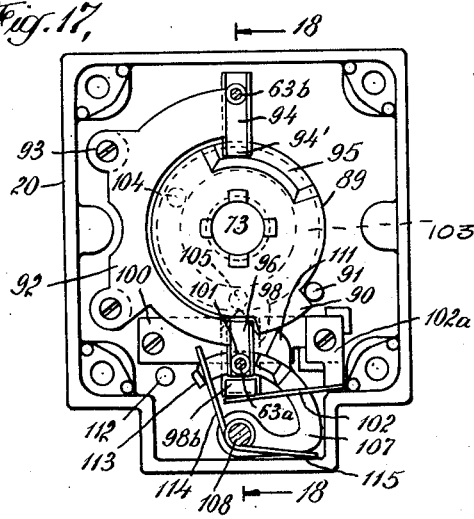
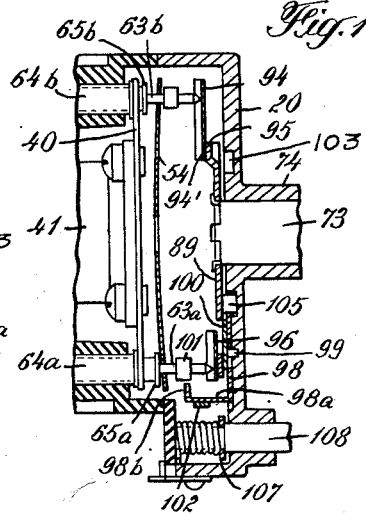
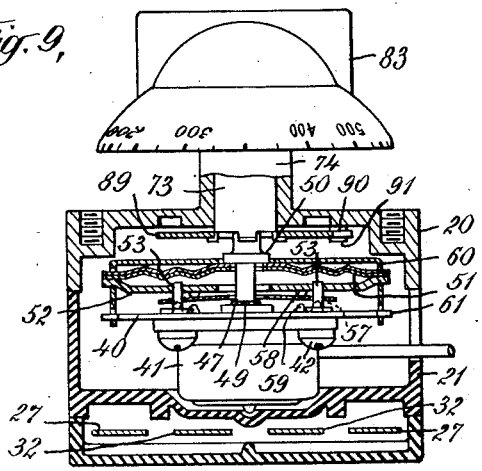
INVENTOR
Malcolm K. Parkhurst
BY
Pennie Davis Marvin & Edmonds
ATTORNEYS Patented Dec. 17, 1940

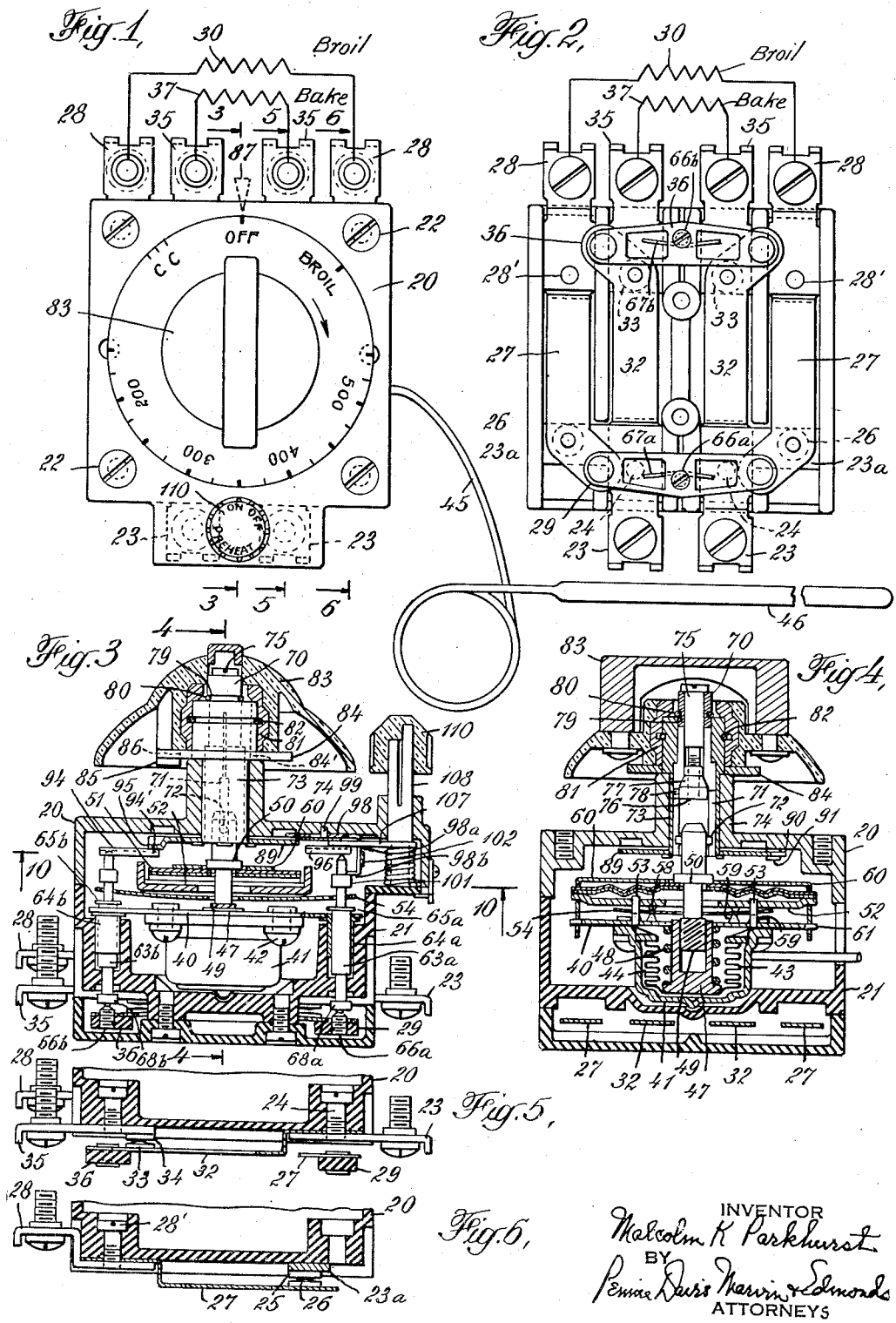

2,224,983

UNITED STATES PATENT OFFICE 2,224,983

TEMPERATURE CONTROL FOR ELECTRICAL APPLIANCES

Malcolm K. Parkhurst, New York, N. Y., assignor to The Wilcolator Company, Newark, N. J., a corporation of Delaware Application February 28, 1940, Serial No. 321,163

20 Claims. (Cl. 219—20)

This invention relates to temperature regulators for electric ovens of the type which includes a baking element and a broiling element. More particularly, the invention has reference to a novel temperature regulator for controlling the two heating elements thermostatically which includes a control handle operable both to adjust the regulator to different temperature settings and to cause simultaneous operation of the two elements by the normal movement of the handle from its "off" position to the desired temperature setting, without any preliminary cocking operation, to preheat the oven quickly to the desired temperature, after which the baking element alone operates under control of the thermostat to maintain the temperature. The new regulator is adapted for selective operation to provide the preheating cycle with both heating elements operating together or to prevent simultaneous operation of the two elements during the initial heating, without requiring special manipulation of the control handle.

Thermostatic regulators have been devised heretofore which operate to connect an oven baking element and an oven broiling element simultaneously to a current source for quickly preheating the oven, and then to disconnect the elements automatically and thereafter connect only the baking element to maintain the desired temperature. Such a regulator is disclosed in a co-pending application of Benson F. Waddell, Serial No. 293,170, filed September 2, 1939. In the regulator there shown, the baking and broiling elements are always operated together to preheat the oven when the control handle is turned from its "off" position to a relatively high baking temperature setting, and after the desired temperature is reached the thermostat de-energizes the heating elements and operates only the baking element. While this provides for more rapid heating of the oven than with prior regulators wherein the broiling element is always de-energized during operation of the baking element, it is sometimes desirable to heat the oven from room temperature to a high baking temperature without operating the broiling element, as for example, when the baking is to be controlled by a clock, in which case direct radiation from the broiling element might spoil the food during the initial heating operation.

The present invention, therefore, is directed to the provision of a novel temperature regulator which includes, in addition to the temperature control handle, a simple selector means operable in one position to provide for energizing of the baking element alone and in another position to provide for simultaneous energizing of the baking and broiling elements, when the control handle is turned from its "off" position to a baking temperature setting. A regulator made in accordance with the invention comprises a thermostat subjected to the oven heat, and a control means for connecting and disconnecting the heating elements to a power source and operable by both the thermostat and the control handle and adjustable to different temperature settings by the handle. When the handle is in its "off" position, the control means maintains both heating elements de-energized, but when the handle is moved through the baking positions to the opposite end of its range of movement, which is the "broil" position, the control means maintains only the baking element de-energized and causes operation of the broiling element, preferably under control of the thermostat.

The operation of the control means when the handle is turned to an intermediate or baking position varies according to the position of the selector means. When the latter is set for preheating, the control means causes simultaneous energizing of the two elements as the handle is moved to a baking position, and then prevents further operation of the broiling element when the temperature is reached, so that the baking element alone continues to operate under control of the thermostat. However, when the selector means is set in its opposite position, the broiling element is prevented from operating except when the handle is turned to the broil position, and, accordingly, when the handle is turned to a baking position the oven is initially heated by the baking element alone. Thus, the selector means provides for initial heating of the oven by both heating elements operating together to obtain a rapid preheat, or by the baking element alone, as desired, without interfering in any way with the operation of the control handle to selectively energize the heating elements or to adjust for different temperatures. The control handle is always operated in the same manner regardless of the position of the selector means and does not require cocking or other special manipulation in adjusting for baking temperatures.

For a better understanding of the invention, reference may be had to the accompanying drawings, in which Fig. 1 is a plan view of one form of the new regulator showing diagrammatically a baking element and a broiling element connected thereto;

Fig. 2 is a bottom view of the regulator, with the bottom cover removed, showing the switches for controlling the heating elements;

Fig. 3 is a sectional view on the line 3—3 in Fig. 1 with the snap mechanism in position to permit closing of one or both of the switches for the heating elements;

Fig. 4 is a sectional view on the line 4—4 in Fig. 3;

Figs. 5 and 6 are sectional views on the lines 5—5 and 6—6, respectively, in Fig. 1 showing only the lower part of the regulator with the bottom cover removed;

Fig. 7 is a plan view of the regulator with the top part removed, showing the sub-assembly which includes the snap mechanism;

Fig. 8 is a detail view of a washer used in calibrating the regulator;

Fig. 9 is a view similar to Fig. 4 but showing the snap mechanism in the opposite position to open the switches for the heating elements;

Fig. 10 is a sectional view on the line 10—10 in Fig. 3, with the selector means set for preheat and the control handle in its "off" position;

Fig. 11 is a view similar to Fig. 10 but with the control handle turned to a low temperature setting;

Fig. 12 is a sectional view on the line 12—12 in Fig. 11;

Fig. 13 is a view similar to Figs. 10 and 11 but with the control handle in the "broil" position;

Fig. 14 is a sectional view on the line 14—14 in Fig. 13;

Fig. 15 is a view similar to Fig. 10 but with the selector means set to prevent simultaneous operation of the two heating elements during the initial heating;

Fig. 16 is a sectional view on the line 16—16 in Fig. 15;

Fig. 17 is a view similar to Fig. 15 but with the control handle in the "broil" position, and Fig. 18 is a sectional view on the line 18—18 in Fig. 17.

The new regulator, as shown, comprises a casing having an upper section 20 and a lower section 21 held together by screws 22. The lower section 21 is made of insulating material and carries a pair of terminal members 23 adapted for connection to the two sides of a current source (not shown). Each of the terminals is secured to the section 21 by a screw 24 and is provided with an arm 23a extending at right angles to the main body of the terminal. On the lower face of each arm 23a is a contact 25 coacting with a movable contact 26 mounted on a flexible contact arm 27. Each arm 27 is clamped to the casing section 21 by a terminal 28 secured by a screw 28' extending downwardly through section 21 and arm 27 and threaded into the terminal 28. The two contact arms 27 extend parallel to each other near the opposite sides of the casing and are connected together at their free ends by a cross member 29 made of insulating material. A broiling element 30, which may be located near the top of an oven (not shown), is connected to the two terminals 28 and is adapted to be energized by a circuit traceable from one of the terminals 23 through its arm 23a, the adjacent contacts 25, 26, the corresponding contact arm 27 and terminal 28, broiling element 30, the other terminal 28, the contact arm 27 connected thereto, the corresponding contacts 26, 25, to the other terminal 23. The contact arms 27 are made of spring metal and tend to move the contacts 26 into engagement with contacts 25.

Clamped between each of the terminals 23 and the casing section 21 is a contact arm 32 having a contact 33 which coacts with a fixed contact 34 on a terminal 35. The contact arms 32 extend parallel to the arms 27 but are disposed a considerable distance inwardly from the sides of the casing, and the respective terminals 35 project from the casing adjacent the terminals 28. The arms 32 are connected together at their free ends by a cross member 36 similar to the member 29. A baking element 37, which may be located near the bottom of the oven, is connected to the two terminals 35 and is adapted to be energized by a circuit traceable from one of the terminals 23 through the adjacent contact arm 32, the corresponding contacts 33, 34, the corresponding terminal 35, the baking element 37, the other terminal 35, the adjacent contacts 34, 33, the corresponding arm 32, to the other terminal 28. The spring action in the contact arms 32 tends to maintain the contacts 33, 34 closed.

The contact arms 27 and 32 are movable to open circuit positions to de-energize the heating elements by a thermostatic snap mechanism mounted on a main supporting plate 40. The plate 40, as shown particularly in Fig. 7, fits closely in the housing section 21 which is provided with a suitable seat for the plate. A cup-shaped member 41 is secured at its open end to the lower face of plate 40 by screws 42 extending through a flange on the cup 41 into the plate, and a metallic bellows 43 in the cup is mounted at its open end near the open end of the cup so as to form with the cup an expansible and contractible chamber 44. A flexible tube 45 communicates with the chamber 44 and extends through a suitable opening in the casing to a bulb 46 adapted to be placed in the oven, and the bulb, tube and chamber are filled with a thermo-responsive fluid, preferably chlorinated diphenol or any other suitable liquid capable of retaining its liquidity throughout the temperature range to which it is subjected in the oven. Expansion of the thermo-responsive fluid in the bulb causes the bellows 43 to collapse and engage the head of an actuator 47 in the bellows, the actuator being slidable through the plate 40 but held against rotation therein. The actuator is urged toward the end of the bellows by a spring 48 coiled around the actuator and seated at one end on the plate 40 and at the opposite end on the head of the actuator.

A stem 49 threaded in the actuator 47 extends upwardly through the plate 40 and is provided with a shoulder 50 adapted to engage a compensating element 51 which, as shown, is in the form of a strip of bimetal having corrugations extending transversely to the length of the strip. The compensator 51 is seated at its ends on the offset ends of a pressure plate 52 so that the intermediate portion of the compensator is free and may flex relative to the pressure plate. Projecting upwardly from the supporting plate 40 on each side of the stem 49 is a pin 53 which extends through a snap element 54 into an opening in the pressure plate 52. The snap element 54 may be of any desired form but is preferably of the form disclosed in said co-pending application Ser. No. 293,170. More particularly, the snap element comprises a thin, flexible sheet of spring metal of generally rectangular form which is provided with slots 55 radiating from the central portion thereof toward the corners but terminating short of the corners (Fig. 7). The metal between the outer end of each slot and the adjacent corner is gathered and bent out of the plane of the sheet, as shown at 56, so as to reduce the effective perimeter of the sheet. As a result, the sheet assumes a concavo-convex form normally convex on its upper surface, as shown in Fig. 9, but is adapted to be flexed to the opposite position shown in Fig. 4, wherein the sheet is concave on its upper surface. Because of the internal stresses in the sheet in the vicinity of the bent portions 56, the sheet returns automatically to the position shown in Fig. 9 as soon as the pressure which flexed it is released. The pins 53 permit the sheet 54 to snap from one position to the other but prevent lateral or endwise displacement of the sheet.

The lower face of the snap element 54 is seated on detents 57 (Fig. 7) located on the supporting plate 40 on opposite sides of the stem 49. There are two detents 57 on each side of the stem 49, and these detents are disposed substantially in line with the pins 53 on opposite sides thereof. On its upper face, the snap element 54 is engaged by two detents 58 which project downwardly from the pressure plate 52 on opposite sides of the stem 49 but are located nearer the stem than the detents 57. Accordingly, when the pressure plate 52 is moved downwardly, the detents 58 in conjunction with the detents 57 operate to distort the snap element and force it to the position of opposite curvature shown in Fig. 4. If desired, the supporting plate 40 may be provided with additional detents 59 disposed below the detents 58 for preventing further distortion of the snap element after it moves to the flexed position shown in Fig. 4. The compensator 51 and the pressure plate 52 are formed with reduced ends and are held in position by a retaining strap 60 resting on top of the compensator and having downwardly extending legs provided with slots which receive the reduced ends of these members. The strap 60 is secured by lugs 61 which project from the plate 40 through slots in the legs of the strap near the lower end thereof. It will be observed that the snap element 54, the pressure plate 52, the compensator 51 and the strap 60 have aligned openings through which the stem 49 extends loosely so that it may move axially relative to these members.

The movements of the snap element 54 are adapted to control the broil switches 25, 26 and the bake switches 33, 34 through pins 63a and 63b, respectively, which extend downwardly from the snap element through the supporting plate 40 and through sleeves 64a and 64b, respectively, secured to the supporting plate. Above the plate 40, the pins 63a and 63b are formed with shoulders 65a and 65b engageable by the opposite end portions, respectively, of the snap element 54. At their lower ends the pins 63a and 63b rest on set screws 66a and 66b on the cross pieces 29 and 36, respectively. The screws 66a and 66b fit loosely in holes drilled in the cross members but the screw threads are engaged by hair springs 67a and 67b, respectively, secured to the cross members and extending transversely through the openings. These springs act as threads on which the screws may be adjusted to different positions on the cross members and also serve to bias the set screws against the sides of their respective openings to prevent loosening of the screws. The spring action of the contact arms 27 and 32 tends to raise the cross pieces 29 and 36 and the pins 63a and 63b so that their respective contacts 25, 26 and 33, 34 may close, but when the snap element 54 is in its normal position, shown in Fig. 9, the ends of the element engage the shoulders 65a and 65b and depress the pins 63a and 63b so that the contacts are held open. Preferably, the pins 63a and 63b are provided near their lower end with enlargements 68a and 68b, respectively, for limiting the upward movement of the pins. By adjusting the set screws 66a and 66b, the positions of the cross arms 29 and 36 relative to their respective pins 63a and 63b may be varied so as to vary the pressure between the contacts when the latter are closed.

The temperature at which the snap element 54 operates may be varied by rotating the stem 49. That is, when the stem is rotated clockwise it acts to draw the actuator 47 upwardly away from the end of the bellows thermostat and compress the spring 48, so that the end of the bellows must move further upwardly under the action of the thermo-responsive fluid before it can engage the head of the actuator and release the pressure on the snap element. Conversely, when the stem 50 is rotated counter-clockwise, the actuator 47 moves downwardly under the action of spring 48 and assumes a position nearer the end of the bellows thermostat, whereby a relatively small expansion of the thermo-responsive fluid will move the end of the bellows against the actuator 47 and raise the shoulder 50.

Rotation of the stem 50 to different temperature settings is preferably effected by an adjustment means comprising a hollow shaft 70 provided with diametrically opposed slots 71 extending upwardly from its lower end for receiving a pair of lugs 72 on the upper part of the stem 49. Thus, the stem is caused to rotate with the shaft 70 but may move axially thereof. The shaft 70 is rotatably mounted in a sleeve 73 which, in turn, is mounted for rotation in a boss 74 projecting from the top of the upper section 20 of the casing. A screw 75 extends loosely into the hollow shaft 70 and is provided with a head engaging the top of the shaft. Threaded on the lower part of the screw 75 is a wedge-shaped member 76 which is drawn by the screw against a wedge surface 77 in the hollow shaft 70 so as to expand the lower portion of the shaft in the region of the slot 71. This expanding of the shaft causes it to frictionally engage the sleeve 73 so that the sleeve and the shaft rotate together. A lug 78 on the wedge member 76 is received in one of the slots 71 so as to prevent turning of the wedge member with the screw 75 in drawing the wedge member against the surface 77. The shaft 70 and sleeve 73 are formed with shoulders 79 to prevent the shaft from moving upwardly through the sleeve, and a snap ring 80 disposed in a suitable groove in the shaft prevents the latter from moving downwardly through the sleeve. A collar 81 is mounted on the sleeve above the boss 74 and is held against axial movement on the sleeve by a snap ring 82 fitted in aligned grooves in the sleeve and collar. The sleeve 73 and shaft 70 are adapted to be rotated by a control handle 83 secured to the collar and keyed to the sleeve by a washer 84 between the collar and the end of boss 74. The washer, as shown in Fig. 8, is provided with a key 84' disposed in a longitudinal slot in the sleeve, and the handle is formed with a lug 85 disposed in a peripheral slot 86 in the washer. On its face, the washer is provided with temperature graduations which are used in calibrating the regulator, as will be described in greater detail presently. The handle, as shown in Fig. 1, coacts with a fixed index 87 and has an "off" position, a cold check position ("CC"), a scale of temperature graduations, and a "broil" position.

The sleeve 73 at its lower end projects into the casing and is connected to a cam disk 89 which rotates with the handle 83 and the sleeve. Rotation of the handle is limited by a finger 90 on the cam disk which engages a fixed stop 91 in the casing. A generally U-shaped spring plate 92 is secured at its base in the casing at spaced points by screws 93, and on one arm of the spring plate is a trough-shaped member 94 having a projection 94' extending beneath the disk 89. The trough-shaped member 94 overlies an extension of the bake pin 63b which projects upwardly through an opening in the snap element 54 and is normally urged by the spring arms 32 against the trough member 94. A cam 95 on the disk 89 is adapted to engage and depress the projection 94' when the handle is in either of its extreme positions, as shown in Figs. 10 and 13. When the trough member 94 is thus depressed by the cam 95, the bake pin 63b is likewise depressed, as shown in Fig. 3, so that the bake switches 33, 34 are held open. Thus, with the handle 83 in either the off position or the broil position, the bake contacts are held open by the cam 95 and the trough member 94 regardless of the operation of the snap element. When the cam 95 is moved away from trough member 94, the spring plate 92 moves the trough member upwardly so as to release the bake pin 63b.

The other arm of the spring plate 92 is formed with a trough-shaped portion 96 which, however, does not lie in the path of the cam 95. The trough member 96 projects radially outwardly from the cam disk 89 and overlies an extension on the broil pin 63a which projects upwardly through an opening in the snap element 54 and is adapted to seat in the trough member 96. Normally, the trough member 96 is maintained in an elevated position by the spring plate 92, but it is adapted to be depressed by a selector mechanism, to be described presently, so as to depress the broil pin 63a and hold the broil contacts 25, 26 open.

Mounted in a recess in the top of casing section 20 is a tumbler 98 which is slidable radially with respect to the cam disk 89. The tumbler is guided in its movement by a pin 99 projecting downwardly from the top of the casing into a slot in the tumbler. A thin plate 100 is secured to the casing section 20 beneath the tumbler 98 to hold the tumbler in its recess. At its outer end, the tumbler is provided with a downwardly extending portion 98a which terminates in a finger 98b extending inwardly toward the broil pin 63a. This finger coacts with a shoulder 101 on the broil pin and normally overlies the shoulder so as to hold the broil pin in its depressed position with the broil contacts 25, 26 open. A leaf spring 102 engages the downwardly extending portion 98a of the tumbler and urges the tumbler inwardly so that its inner end, which is pointed, normally lies in an annular groove 103 in the top of casing section 20. The spring 102 may be mounted in the casing on a leg 102a secured to the top of the casing over the plate 100. On the upper face of the cam disk 89 are two pins 104 and 105 projecting into the annular groove 103, and on rotation of the control handle 83 these pins successively engage the inner end of the tumbler 98 and move the tumbler outwardly against the action of spring 102, whereby the finger 98b on the tumbler is moved away from the broil pin. When either of the pins 104, 105 is opposite the pointed end of the tumbler, the finger 98b on the tumbler is held out of the path of shoulder 101 on the broil pin, but as soon as the pin 104 or 105 is moved away from the tumbler, the spring 102 moves the finger 98b inwardly against the side of shoulder 101 or over the top of the shoulder, depending on the position of the broil pin.

The selector mechanism for depressing the trough member 96 comprises an arcuate cam 107 rotatable in the casing on a shaft 108 which, as shown, extends parallel to shaft 70 through a second boss on the top of casing section 20. A cam surface 109 on the cam 107 is adapted to engage the top of trough member 96 and depress this member when the cam is rotated by its shaft, which may be provided with a handle 110. Rotation of the handle 110 is limited in one direction by a finger 111 on the cam 107 engageable with a fixed stop 112, and in the other direction by a downwardly extending ear 113 on the end of cam 107 engageable with a spring 114. The spring 114, as shown, is coiled around the shaft 108 below cam 107, and one end of the spring engages the stop 112 while the other end is seated against the side of the casing, as shown at 115.

The operation of the regulator is as follows: When the oven is at room temperature and the handle 83 is in its "off" position, the actuator 47 is seated against the end of the bellows, and the snap element 54 assumes its normal unflexed position shown in Fig. 9, since the pressure plate 52 exerts only a slight pressure on the snap element. The broil pin 63a is held in its depressed position by the finger 98b on the tumbler which engages the top of shoulder 101, and the bake pin 63b is held in its depressed position by the trough member 94 which is depressed by the cam surface 95 on the cam disk (Figs. 3 and 10). Accordingly, the bake and broil switches 33, 34 and 25, 26, respectively, are held open independently of the snap element 54, so that the baking and broiling circuits cannot be energized by accidental operation of the snap element.

When the oven is to be used for baking and it is desired to bring the oven quickly to the desired temperature, the selector handle 110 is turned to its "preheat on" position (Fig. 1) indicated by suitable indicia on the face of the handle. In this position of the selector handle, the cam surface 109 is out of engagement with the trough member 96, as shown in Fig. 10. The control handle 83 is then turned clockwise, as viewed in Fig. 1, so as to screw the stem 49 into the actuator 47. This results in an increase in the pressure of the stem shoulder 50 against the compensator 51, and the increased pressure is transmitted to the pressure plate 52 which acts through detents 58 to force the snap element 54 to its flexed position shown in Figs. 3 and 4. During this rotation of the handle, the cam surface 95 is moved away from the trough member 94 which, under the action of a spring plate 92, moves to its elevated position. Accordingly, when the ends of the snap element flex upwardly to the position shown in Figs. 3 and 4, under the action of the pressure plate, the bake pin 63b is raised by the contact arms 32 so that the contacts 33, 34 close and the bake element 36 is energized. This upward movement of the bake pin 63b causes its shoulder 65b to engage or substantially engage the upturned end of the snap element.

As the handle 83 moves through the cold check CC position the pin 104 on the cam disk engages the pointed end of tumbler 98 and moves the finger 98b away from the shoulder 101 on the broil pin. As a result, the contact arms 27 move the broil pin 63a upwardly so that the contacts 25, 26 are closed and the broiling element 30 is energized. This upward movement of the broil pin causes its shoulder 65a to engage or substantially engage the adjacent end portion of the snap element 54, and also causes the shoulder 101 on the broil pin to move upwardly to a position opposite the end of tumbler finger 98b, as shown in Figs. 11 and 12. Accordingly, as the handle 83 rotates beyond the cold check position and the pin 104 moves away from the tumbler 98, the tumbler finger 98b is urged against the side of the shoulder 101 on the broil pin by the leaf spring 102. Thereafter, further rotation of the handle 83 in a clockwise direction acts to move the actuator 47 away from the end of the bellows an amount determined by the temperature for which the handle is set, as indicated by the index 87 and the graduations on the handle.

The baking element 31 and the broiling element 30 are now energized and operate to preheat the oven quickly to the desired temperature. As the oven temperature rises, the fluid in bulb 46 expands and collapses the bellows 43 so as to cause the end thereof to re-engage the actuator 47 and then move the actuator 47 upwardly against spring 48, whereby the pressure of shoulder 50 on the compensator 51 and pressure plate 52 is relieved. When the oven is heated to the temperature for which the handle is set, the pressure of plate 52 on the snap element is relieved sufficiently to allow the latter to snap back to its normal position and depress the pins 63a and 63b, so that the switches 33, 34 and 25, 26 are opened and the baking and broiling circuits are de-energized. As the broil pin 63a moves downwardly under the action of the snap element, the shoulder 101 moves below the finger 98b of the tumbler, whereupon the leaf spring 102 moves the finger 98b back to its initial position over the top of shoulder 101. The broil pin 63a is thus locked in its depressed position and the broil contacts 25, 26 are held open to maintain the broiling element de-energized, regardless of the movements of the snap element 54.

As the oven cools, the thermo-responsive fluid in the bulb 46 contracts and allows spring 48 to expand the bellows and move the actuator 47 downwardly so as to increase the pressure on plate 52 until the snap element moves again to its flexed position shown in Fig. 3. As soon as the ends of the snap element move upwardly as a result of this flexing action, the bake pin 63b is moved to its elevated position by the contact arms 32, and the bake contacts 33, 34 are again closed to re-energize the baking element. However, the broil pin 63a remains locked in its depressed position by the tumbler finger 98b so that the broiling element cannot be energized. Thus, the baking element thereafter operates alone under control of the snap element 54 to maintain a substantially uniform oven temperature.

When the oven is to be used for broiling, the handle 83 is turned beyond the highest temperature setting so that the "broil" marking is under the fixed index 87. As the handle approaches the "broil" position, the advancing end of the cam surface 95 moves into engagement with the trough member 94 and depresses this member so as to lock the bake pin 63b in its lower position, whereby the bake contacts 33, 34 are held open and the baking element 36 is maintained de-energized. Also, when the handle 83 reaches the "broil" position, the finger 90 on disk 89 engages the stop 91, and the second pin 105 on the cam disk engages the pointed end of tumbler 98 and holds the finger 98b away from the shoulder 101 on the broil pin throughout the broiling operation (Figs. 13 and 14). The broil pin 63a, therefore, is moved upwardly by the contact arms 27 to engage the shoulder 65a with the snap element and allow the broil contacts 25, 26 to close. The broiling element is thus energized, and when the oven is heated to the temperature for which the handle is set in its "broil" position, the bellows 43 acts through the actuator 47 and the shoulder 50 to release the pressure on the snap element sufficiently for the element to return to its normal position. The broil pin 63a is then depressed by the snap element and opens the broil switch until the oven cools sufficiently to cause the snap element to move back to its flexed position and allow the broiling contacts to close again.

When it is desired to heat the oven to a baking temperature without the use of the broiling element, the selector handle 110 is turned counterclockwise, as seen in Fig. 1, to the "preheat off" position. In this position of the selector handle, the cam surface 109 is directly over the trough member 96 (Figs. 15 and 16) so that the latter and the broil pin 63a are locked in their depressed positions and operation of the broiling element is prevented. Also, the finger 111 is now in the path of finger 90 on the cam disk, and the ear 113 engages the spring 114. The control handle 83 is then set for the desired baking temperature, and as it is rotated the trough member 94 is released and the snap element 54 is moved to its flexed position so that the bake pin 63b moves upwardly and the bake contacts 33, 34 close, as previously described. Although the tumbler finger 98b is moved away from shoulder 101 on the broil pin by this rotation of handle 83, the broil pin remains locked in its depressed position by the trough member 96. Accordingly, the baking element alone is energized and operates under control of the thermostat and the snap element to heat the oven to the desired temperature and then maintain it at substantially that temperature.

If it is desired to use the oven for broiling when the selector handle 110 is in the "preheat off" position, the control handle 83 is turned to the "broil" position as previously described. As it approaches this position, the finger 90 on the cam disk engages the finger 111 on the selector cam 107 and moves the latter clockwise, as seen in Fig. 15, to the position shown in Fig. 17. As a result, the spring 114 is flexed by the ear 113, and the cam 109 is moved away from trough member 96. When the cam 107 is thus moved to the position shown in Fig. 17, further rotation of control handle 83 causes the periphery of finger 90 to ride over the end of the finger 111. When the control handle reaches the broil position, the pin 105 engages tumbler 98 and moves it outwardly so as to disengage the finger 98b from shoulder 101 on the broil pin. Since the cam surface 109 is now removed from its position over the trough member 96, the broil pin 63a will move upwardly under the action of contact arms 27, whereby the broil contacts 25, 26 close and the shoulder 65a engages the snap element. Thereafter, the broil pin 63a is alternately depressed and raised by the snap element and the contact arms 27 so as to energize and de-energize the broiling element and maintain a substantially uniform temperature.

When the handle 83 is moved back to its "off" position or to a baking position, the finger 90 on the cam disk disengages finger 111 on the selector cam 107, whereupon the spring 114 snaps back against the stop 112 and returns the cam 109 into engagement with the trough member 96 so as to open the broil switch 25, 26.

In calibrating the regulator, the handle 83 and collar 81 are first removed from the sleeve 73 by forcing the snap ring 82 out of its groove in the sleeve. Then the screw 75 is loosened by unscrewing it while holding the shaft 70 stationary, whereby the wedge member 76 disengages the wedge surface 77 of the shaft and allows the shaft to rotate relative to the sleeve. The sleeve is then adjusted until the temperature indicated on the washer 84 under the fixed index 87 corresponds to the measured temperature to which the bulb 46 is subjected. Then, while holding the washer and sleeve stationary, the shaft is rotated until the stem 49, which rotates with the shaft, actuates the snap element. The screw 75 is then tightened while holding the shaft 70 stationary, so that the wedge member 76 again causes the shaft and sleeve to move together, and the handle is replaced. Thus, the calibrating may be performed quickly and easily without disassembling the regulator.

It will be observed that the temperature adjustment handle 83 is always manipulated in the same manner when it is desired to bake or broil, by moving it directly to the desired setting, regardless of the position of the selector handle 110. Because of the selector handle, it is unnecessary to perform any special manipulation of the adjustment handle 83, such as a cocking operation, to energize the heating elements simultaneously and preheat the oven. The selector handle 110 and its associated parts provide a simple means for preventing or permitting operation of the broil element with the bake element in the initial heating of the oven, as desired, without interfering with the normal operation of the adjustment handle 83.

The control means for the baking and broiling elements, comprising the switches 33, 26 and their respective spring actuators 32, 27 and pins 63b, 63a, are operable by both the thermo-responsive snap element 54 and the adjustment handle 83, the latter being adapted to control the switches through the control mechanism including—the cam disk 89, the tumbler 98 for the broil pin and the trough member 94 for the bake pin. With this construction, the regulator requires only two switches, one for each heating element, and, accordingly, the contacts and terminals may be relatively few in number. The snap acting mechanism, including the snap element 54, its mounting and the pressure plate 52, and the thermo-responsive means including the cup 41, the bellows, the tube and bulb and the fluid filling, are in a unitary sub-assembly of compact construction which may be detached bodily from the casing by removing the supporting plate 40 to which these parts are connected.

The actuator 47, spring 48 and stem 49, likewise included in the sub-assembly, serve as an adjustable connection between the thermo-responsive means and the snap acting mechanism, which connection is adjusted by the handle 83 through shaft 70. Changes in ambient temperature are counteracted by the compensator 51, also a part of the sub-assembly, which flexes so as to offset the expansion or contraction of the fluid in chamber 44 due to such temperature changes.

I claim:

1. In a temperature regulator for an electric oven including baking and broiling elements, the combination of means responsive to temperature changes in the oven, control means for connecting and disconnecting said elements to a current source and operable by the thermo-responsive means, a control handle for operating the control means independently of the thermo-responsive means and movable to adjust the thermo-responsive means to different temperature settings, the control means being operable by movement of the handle from an off position to a bake position to connect both heating elements to the current source simultaneously for preheating the oven, and the control means being operable by the thermo-responsive means to disconnect said elements from the current source after preheating and thereafter to connect the baking element to said source under control of the thermo-responsive means while maintaining the broiling element disconnected, and selector means coacting with the control means and operable independently of the handle for securing the broiling element against operation when the handle is moved to a bake position.

2. In a temperature regulator for an electric oven including independent baking and broiling elements, the combination of means responsive to temperature changes in the oven, control means for connecting and disconnecting said elements to a current source and operable by the thermo-responsive means, a control handle for operating the control means independently of the thermo-responsive means and movable to adjust the thermo-responsive means to different temperature settings, the control means being operable by movement of the handle from an off position to a bake position to connect both heating elements to the current source simultaneously for preheating the oven, and by movement of the handle to a broil position to connect the broiling element to the current source and disconnect the baking element, the control means being operable by the thermo-responsive means to disconnect said elements from the current source after the preheating and thereafter connect the baking element to said source under control of the thermo-responsive means while maintaining the broiling element disconnected, and selector means coacting with said control means and operable independently of the handle for securing the broiling element against operation when the handle is moved to a bake position.

3. In a temperature regulator for an electric oven including baking and broiling elements, the combination of means responsive to temperature changes in the oven, switches for the baking element and the broiling element, respectively, for connecting and disconnecting said elements to a current source and operable by the thermo-responsive means, a control handle for adjusting the thermo-responsive means to different temperature settings, actuating means operable on movement of said handle from an off position to a baking temperature setting for causing both switches to close and energize the two heating elements simultaneously, means under control of the thermo-responsive means for securing the broil switch in open circuit position after initial heating of the oven and while the bake switch is alternately opened and closed by the thermo-responsive means, and selector means coacting with said actuating means and operable independently of the handle for securing the broil switch against closing when the handle is moved from its off position to a baking temperature setting.

4. In a temperature regulator for an electric oven including baking and broiling elements, the combination of means responsive to temperature changes in the oven, switches for the baking element and the broiling element, respectively, for connecting and disconnecting said elements to a current source and operable by the thermo-responsive means, a control handle for adjusting the thermo-responsive means to different temperature settings, locking means coacting with the broil switch for rendering the broil switch inoperable by the thermo-responsive means after initial opening of the broil switch under control of the thermo-responsive means, control mechanism operable by rotation of the handle from an off position to a baking temperature setting for causing both of the switches to close and energize said elements simultaneously, and selector means coacting with the broil switch and operable independently of the handle for securing the broil switch in open position on movement of the handle from an off position to a baking temperature setting.

5. In a temperature regulator for an electric oven including baking and broiling elements, the combination of means responsive to temperature changes in the oven, switches for the baking element and the broiling element, respectively, for connecting and disconnecting said elements to a current source and operable by the thermo-responsive means, a control handle for adjusting the thermo-responsive means to different temperature settings, locking means normally securing the broil switch in open circuit position and adapted to render the broil switch inoperable by the thermo-responsive means after initial opening of the broil switch under control of the thermo-responsive means, locking means normally securing the bake switch in open circuit position, control mechanism operable by rotation of the handle from an off position to a baking temperature setting for releasing said locking means for the two switches to cause the switches to close and energize the heating elements simultaneously, and selector means coacting with the broil switch and operable independently of the handle for securing the broil switch in open position on movement of the handle from an off position to a baking temperature setting.

6. In a temperature regulator for an electric oven including baking and broiling elements, the combination of thermo-responsive switch mechanism for connecting and disconnecting the baking element to a current source, a thermo-responsive switch mechanism for connecting and disconnecting the broiling element to the current source, a control handle for adjusting the regulator to different temperature settings, control mechanism operable by the handle for causing both switches to close when the handle is moved from an off position to a baking temperature setting and for causing said bake switch to open and said broil switch to close when the handle is moved to a broil position, and selector means coacting with the broil switch and operable independently of the handle for securing the broil switch in open position when the handle is moved to a baking temperature setting.

7. In a temperature regulator for an electric oven including baking and broiling elements, the combination of thermo-responsive switch mechanism for connecting and disconnecting the baking element to a current source, a thermo-responsive switch mechanism for connecting and disconnecting the broiling element to the current source, a control handle for adjusting the regulator to different temperature settings, control mechanism operable by the handle for causing both switches to close when the handle is moved from an off position to a baking temperature setting and for causing said bake switch to open and said broil switch to close when the handle is moved to a broil position, selector means coacting with the broil switch and movable independently of the handle to an operative position for holding the broil switch open when the handle is moved to a baking temperature setting, and means operable by the handle for moving the selector means to an inoperative position when the handle is moved to said broil position.

8. In a temperature regulator for an electric oven including independent baking and broiling elements, the combination of means responsive to temperature changes in the oven, control means for connecting and disconnecting said elements to a current source and operable by the thermo-responsive means, a control handle for operating the control means independently of the thermo-responsive means and movable to adjust the thermo-responsive means to different temperature settings, the control means being operable by movement of the handle from an off position to a bake position to connect both heating elements to the current source simultaneously for preheating the oven, and by movement of the handle to a broil position to connect the broiling element to the current source and disconnect the baking element, the control means being operable by the thermo-responsive means to disconnect said elements from the current source after the preheating and thereafter connect the baking element to said source under control of the thermo-responsive means while maintaining the broiling element disconnected, selector means coacting with said control means and movable independently of the handle to an operative position for securing the broiling element against operation when the handle is moved to a bake position, and means operable by the handle for moving the selector means to an inoperative position when the handle is moved to said broil position.

9. In a temperature regulator for an electric oven including baking and broiling elements, the combination of thermo-responsive switch mechanism for connecting and disconnecting the baking element to a current source, a thermo-responsive switch mechanism for connecting and disconnecting the broiling element to the current source, a control handle for adjusting the regulator to different temperature settings, a tumbler normally locking the switch mechanism for the broiling element in open position and operable automatically to relock the broil element switch mechanism in open position after initial closing and opening thereof, a member normally locking the switch mechanism for the baking element in open position, means operable by the handle for releasing said locking member and tumbler on movement of the handle to a baking temperature setting, whereby said elements are energized simultaneously to preheat the oven, and selector means operable independently of the handle and said tumbler for locking the broil element switch mechanism in open position when the handle is moved to a baking temperature setting.

10. In a temperature regulator for an electric oven including baking and broiling elements, the combination of thermo-responsive switch mechanism for connecting and disconnecting the baking element to a current source, a thermo-responsive switch mechanism for connecting and disconnecting the broiling element to the current source, a control handle for adjusting the regulator to different temperature settings, a cam disk rotatable with the control handle and having a cam thereon for locking said bake element switch mechanism in open position when the handle is in an off position or a broil position, the cam being operable to release the bake element switch mechanism when the handle is turned to a baking temperature setting, a tumbler normally locking the switch mechanism for the broil element in open position, an actuating member on the cam disk for moving the tumbler to an inoperative position when the handle is moved to a baking temperature setting, whereby the bake element switch mechanism and the broil element switch mechanism close simultaneously, means for returning the tumbler automatically to its locking position when said switch mechanisms open thermo-responsively, a second actuating member on the cam disk for moving the tumbler to its inoperative position when the handle is moved to said broil position, and selector means including a cam movable independently of the handle to a position for locking the broil element switch mechanism in open position when the handle is moved to a baking temperature setting.

11. In a temperature regulator for an electric oven including baking and broiling elements, the combination of thermo-responsive switch mechanism for connecting and disconnecting the baking element to a current source, a thermo-responsive switch mechanism for connecting and disconnecting the broiling element to the current source, a control handle for adjusting the regulator to different temperature settings, a cam disk rotatable with the control handle and having a cam thereon for locking said bake element switch mechanism in open position when the handle is in an off position or a broil position, the cam being operable to release the bake element switch mechanism when the handle is turned to a baking temperature setting, a tumbler normally locking the switch mechanism for the broil element in open position, an actuating member on the cam disk for moving the tumbler to an inoperative position when the handle is moved to a baking temperature setting, whereby the bake element switch mechanism and the broil element switch mechanism close simultaneously, means for returning the tumbler automatically to its locking position when said switch mechanisms open thermo-responsively, a second actuating member on the cam disk for moving the tumbler to its inoperative position when the handle is moved to said broil position, selector means including a cam movable independently of the handle to a position for locking the broil element switch mechanism in open position when the handle is moved to a baking temperature setting, and an actuating element on said disk for moving the selector cam to an inoperative position to release the broil element switch mechanism when the handle is moved to said broil position.

12. In a temperature regulator for an electric oven including baking and broiling elements, the combination of a thermo-responsive switch for connecting and disconnecting the baking element to a current source, a thermo-responsive switch for connecting and disconnecting the broiling element to the current source, a control handle for adjusting the regulator to different temperature settings, a cam disk rotatable with the control handle and having a cam thereon for locking said bake switch open when the handle is in an off position or in a broil position, the cam being operable to release the bake switch when the handle is turned to a baking temperature setting, a tumbler normally locking the broil switch open, an actuating member on the cam disk for moving the tumbler to an inoperative position when the handle is moved to a baking temperature setting, whereby said bake and broil switches close simultaneously, means for returning the tumbler automatically to its locking position when said switches open thermo-responsively, a second actuating member on the cam disk for moving the tumbler to its inoperative position when the handle is moved to said broil position, selector means including a cam movable independently of the handle to a position for locking the broil switch open when the handle is moved to a baking temperature setting, actuating means on said disk for moving the selector cam to an inoperative position to release the broil switch when the handle is moved to said broil position, and a stop coacting with said actuating means for limiting rotation of the handle.

13. In a temperature regulator for an electric oven including baking and broiling elements, the combination of a thermo-responsive switch for connecting and disconnecting the baking element to a current source, a thermo-responsive switch for connecting and disconnecting the broiling element to the current source, a control handle for adjusting the regulator to different temperature settings, a cam disk rotatable with the control handle and having a cam thereon for locking said bake switch open when the handle is in an off position or in a broil position, the cam being operable to release the bake switch when the handle is turned to a baking temperature setting, a tumbler normally locking the broil switch open, an actuating member on the cam disk for moving the tumbler to an inoperative position when the handle is moved to a baking temperature setting, whereby the bake and broil switches close simultaneously, means for returning the tumbler automatically to its locking position when said switches open thermo-responsively, a second actuating member on the cam disk for moving the tumbler to its inoperative position when the handle is moved to said broil position, selector means including a cam movable independently of the handle to a position for locking the broil switch open when the handle is moved to a baking temperature setting, the selector cam being movable manually to an inoperative position to release the broil switch, a spring engageable by the selector cam in its locking position, and actuating means on said disk for moving the selector cam to another inoperative position against the action of said spring to release the broil switch when the handle is moved to said broil position, the spring being operable to return the selector cam automatically to its locking position when the handle is moved away from said broil position.

14. In a temperature regulator for an electric oven including baking and broiling elements, the combination of a thermo-responsive switch for connecting and disconnecting the baking element to a current source, a thermo-responsive switch for connecting and disconnecting the broiling element to the current source, a control handle for adjusting the regulator to different temperature settings, a cam disk rotatable with the control handle and having a cam thereon for locking said bake switch open when the handle is in an off position or in a broil position, the cam being operable to release the bake switch when the handle is turned to a baking temperature setting, a tumbler normally locking the broil switch open, an actuating member on the cam disk for moving the tumbler to an inoperative position when the handle is moved to a baking temperature setting, whereby the bake and broil switches close simultaneously, means for returning the tumbler automatically to its locking position when said switches open thermo-responsively, a second actuating member on the cam disk for moving the tumbler to its inoperative position when the handle is moved to said broil position, selector means including a cam movable independently of the handle to a position for locking the broil switch open when the handle is moved to a baking temperature setting, the selector cam being movable manually to an inoperative position to release the broil switch, a stop engageable by the selector cam in its inoperative position, a spring normally engaging the stop and engageable by the selector cam in its locking position, and actuating means on said disk for moving the selector cam to another inoperative position against the action of the spring to release the broil switch when the handle is moved to said broil position, the spring being operable to return the selector cam automatically to its locking position when the handle is moved away from said broil position.

15. In a temperature regulator for an electric oven including baking and broiling elements, the combination of a thermo-responsive switch for connecting and disconnecting the baking element to a current source, a thermo-responsive switch for connecting and disconnecting the broiling element to the current source, a control handle for adjusting the regulator to different temperature settings, a cam disk rotatable with the control handle and having a cam thereon for locking said bake switch open when the handle is in an off position or in a broil position, the cam being operable to release the bake switch when the handle is turned to a baking temperature setting, control mechanism operable by the handle for causing both switches to close when the handle is moved from an off position to a baking temperature setting and for causing said bake switch to open and said broil switch to close when the handle is moved to a broil position, selector means coacting with the broil switch and movable independently of the handle to an operative position for holding the broil switch open when the handle is moved to a baking temperature setting, means operable by the handle for moving the selector means to an inoperative position when the handle is moved to said broil position, and spring means for returning the selector means automatically to its operative position when the handle is moved away from said broil position.

16. In a temperature regulator for an electric oven including baking and broiling elements, the combination of means responsive to temperature changes in the oven, control means for connecting and disconnecting said elements to a current source and operable by the thermo-responsive means, a control handle for operating the control means independently of the thermo-responsive means and movable to adjust the thermo-responsive means to different temperature settings, the control means being operable by movement of the handle from an off position to a bake position to connect both heating elements to the current source simultaneously for preheating the oven, and by movement of the handle to a broil position to connect the broiling element to the current source and disconnect the baking element, the control means being operable by the thermo-responsive means to disconnect said elements from the current source after the preheating and thereafter connect the baking element to said source under control of the thermo-responsive means while maintaining the broiling element disconnected, selector means coacting with said control means and movable independently of the handle to an operative position for securing the broiling element against operation when the handle is moved to a bake position, means operable by the handle for moving the selector means to an inoperative position when the handle is moved to said broil position, and means for returning the selector means to said operative position when the handle is moved away from the broil position.

17. In a temperature regulator for an electric oven including broiling and baking elements, the combination of a switch for connecting and disconnecting the baking element to a current source, a switch for connecting and disconnecting the broiling element to a current source, thermo-responsive means for controlling the switches, actuating elements for the bake and broil switches, respectively, operable by the thermo-responsive means to open the switches, a control handle for adjusting the thermo-responsive means to different temperature settings, a cam disk movable with the control handle and having a cam thereon operable in an off position and in a broil position of the handle to hold the bake switch actuating element out of the influence of the thermo-responsive means, a tumbler coacting with the broil switch actuating element and normally holding said last element out of the influence of the thermo-responsive means, actuating means on the cam disk operable in a bake position of the handle and in said broil position thereof to move the tumbler to an inoperative position and release the broil switch, means responsive to initial operation of the broil switch actuating element by said thermo-responsive means for returning the tumbler to its operative position to lock the broil switch open, and selector means operable independently of the control handle for holding the broil switch actuating element out of the influence of the thermo-responsive means to open the broil switch when the handle is moved to a baking temperature setting.

18. In a temperature regulator for an electric oven including broiling and baking elements, the combination of a switch for connecting and disconnecting the baking element to a current source, a switch for connecting and disconnecting the broiling element to the current source, thermo-responsive means for controlling the switches, actuating elements for the bake and broil switches, respectively, operable by the thermo-responsive means to open the switches, a control handle for adjusting the thermo-responsive means to different temperature settings, a cam disk movable with the control handle and having a cam thereon operable in an off position and in a broil position of the handle to hold the bake switch actuating element out of the influence of the thermo-responsive means, a tumbler coacting with the broil switch actuating element and normally holding said last element out of the influence of the thermo-responsive means, actuating means on the cam disk operable in a bake position of the handle and in said broil position thereof to move the tumbler to an inoperative position and release the broil switch, means responsive to initial operation of the broil switch actuating element by said thermo-responsive means for returning the tumbler to its operative position to lock the broil switch open, selector means operable independently of the handle for holding the broil switch actuating element out of the influence of the thermo-responsive means to open the broil switch when the handle is moved to a bake position, and means for adjusting the relative positions of the handle and said cam disk for calibrating the regulator.

19. In a temperature regulator for an electric oven including broiling and baking elements, the combination of a switch for connecting and disconnecting the baking element to a current source, a switch for connecting and disconnecting the broiling element to the current source, thermo-responsive means for controlling the switches, actuating elements for the bake and broil switches, respectively, operable by the thermo-responsive means to open the switches, a control member rotatable to adjust the thermo-responsive means to different temperature settings, a cam disk movable with the control member for causing operation of the switches independently of the thermo-responsive means to selectively energize said elements, a sleeve connected to one of said disk and control member and a hollow shaft in the sleeve connected to the other, a wedge member in the shaft, the shaft having a wedge surface coacting with the wedge member, and a screw threaded into said wedge member for drawing the same against said surface to expand the shaft against the sleeve, whereby the shaft and sleeve rotate together, the screw being operable to loosen the wedge member to permit relative adjustment of the shaft and sleeve.

20. In a temperature regulator for an electric oven including baking and broiling elements, the combination of means responsive to temperature changes in the oven, switches for the baking element and the broiling element, respectively, for connecting and disconnecting said elements to a current source and operable by the thermo-responsive means, a control handle for adjusting the thermo-responsive means to different temperature settings, locking means normally securing the broil switch in open circuit position and adapted to render the broil switch inoperable by the thermo-responsive means after initial opening of the broil switch under control of the thermo-responsive means, locking means normally securing the bake switch in open circuit position, control mechanism operable by rotation of the handle from an off position to a baking temperature setting for releasing said locking means for the two switches to cause the switches to close and energize the heating elements simultaneously, and an adjustable connection between the thermo-responsive means and each of said switches including a screw, a mounting for the screw having an opening for loosely receiving the screw, and a hair spring secured to the mounting and extending transversely through the opening in engagement with the screw thread.

MALCOLM K. PARKHURST.